United States Patent [19]
Danckaarts et al.

[11] Patent Number: 5,690,708
[45] Date of Patent: Nov. 25, 1997

[54] COLUMN FOR CONTACTING GAS AND LIQUID

[75] Inventors: Anton Matthijs Danckaarts; Enno Frank Wijn, both of Amsterdam, Netherlands

[73] Assignee: Shell Oil Company, Houston, Tex.

[21] Appl. No.: 555,060

[22] Filed: Nov. 8, 1995

[51] Int. Cl.⁶ .................................................. B01D 3/26
[52] U.S. Cl. ........................ 55/257.2; 202/158; 261/114.1
[58] Field of Search .......................... 261/114.1, 114.2; 55/257.2; 202/158

[56] References Cited

U.S. PATENT DOCUMENTS

| | | | |
|---|---|---|---|
| 1,651,354 | 12/1927 | Alexander | 261/114.2 X |
| 1,918,005 | 7/1933 | Urquhart | 261/114.2 |
| 2,042,150 | 5/1936 | Hagenbuch | 261/114.2 |
| 2,055,048 | 9/1936 | Puls | 261/114.2 |
| 2,893,713 | 7/1959 | Haltmeier | 261/114.2 |
| 3,197,286 | 7/1965 | Farkas et al. | 261/114.1 X |
| 3,475,134 | 10/1969 | Weber et al. | 261/114.2 X |
| 3,779,525 | 12/1973 | Tanigawa et al. | 261/114.1 |
| 3,864,439 | 2/1975 | Tanigawa et al. | 261/114.1 |
| 4,060,399 | 11/1977 | Gleason | 261/114.1 X |
| 5,185,017 | 2/1993 | Tanigawa et al. | 55/257 |

FOREIGN PATENT DOCUMENTS

| | | |
|---|---|---|
| 2141858 | 2/1972 | Germany . |
| 1123546 | 8/1968 | United Kingdom . |

Primary Examiner—Richard L. Chiesa

[57] ABSTRACT

In a column for contacting upwardly flowing gas with downwardly flowing liquid, a horizontal tray includes a plate provided with a tubular gas/liquid contact device. The tubular gas/liquid contact device includes a contact section located below the plate, a separation section located above the contact section, and an outlet section located above the separation section and above the plate. The contact section is closed at its bottom, the wall of the contact section is provided with a plurality of tangential gas inlets and a liquid delivery tube opens into the lower end of the contact section. The outlet section has a gas permeable wall provided with a coalescer and the top of the outlet section is provided with a cover.

7 Claims, 1 Drawing Sheet

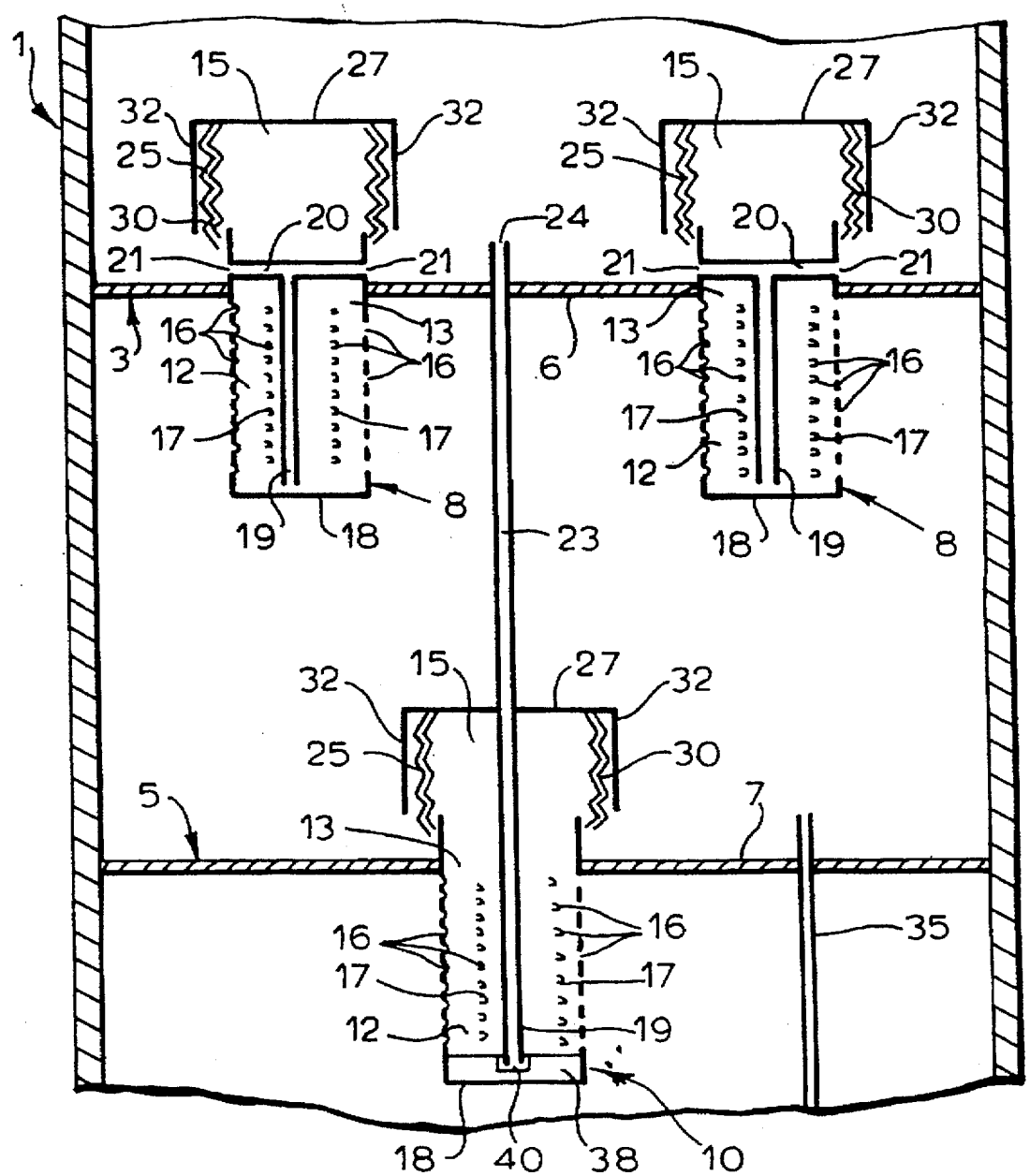

COLUMN FOR CONTACTING GAS AND LIQUID

I. FIELD OF THE INVENTION

The present invention relates to a column for contacting upwardly flowing gas with downwardly flowing liquid in order to transfer mass, heat and momentum between the phases.

II. BACKGROUND OF THE INVENTION

Such columns for contacting gas and liquid are well known, and they are used in for example distillation, rectification, absorption and stripping. In the specification no distinction is made between gas and vapour; the word gas' also refers to vapour.

A column for contacting upwardly flowing gas with downwardly flowing liquid is normally provided with an inlet for gas arranged in the lower part of the column, an inlet for liquid arranged in the upper part of the column, an outlet for liquid arranged in the lower end part of the column and an outlet for gas arranged in the upper end part of the column. In general there will only be one outlet for gas which is located at the upper end of the column; however, the column can be provided with more inlets for liquid and gas and with more outlets for liquid, the number of these inlets and outlets and their locations depend on the application. In the column there is arranged at least one horizontal tray upon which, during normal operation, liquid and gas are brought into contact with each other. An example of such a horizontal tray is a perforated plate provided with a downcomer.

During normal operation of a column provided with a perforated plate having a downcomer, liquid is continuously supplied onto the perforated plate, and it is collected in a layer of liquid on the perforated plate. Gas passing through the holes in the perforated plate is contacted with the liquid on the perforated plate. Excess liquid is withdrawn from the perforated plate through the downcomer, and is delivered onto the next lower perforated plate where contacting continues. It will be understood that when the perforated plate is the lowermost perforated plate, liquid flows to the lower end part of the column from which it is withdrawn through the outlet for liquid. Gas emerging from the liquid layer flows upwardly to the next higher perforated plate where contacting continues. It will be understood that when the perforated plate is the uppermost perforated plate, gas flows to the upper end part of the column from which it is withdrawn through the outlet for gas. The present invention relates in particular to a column for contacting gas and liquid, wherein the horizontal tray comprises a plate provided with a tubular gas/liquid contact device. The tubular gas/liquid contact device comprises a contact section located below the plate, a separation section above the contact section, and an outlet section above the separation section and located above the plate, wherein the contact section is closed at its bottom, wherein the wall of the contact section is provided with a plurality of tangential gas inlets, wherein a liquid delivery tube opens into the lower end of the contact section, and wherein the outlet section has a gas permeable wall provided with coalescer means.

Such a device is disclosed in British patent specification No. 1 123 546. In the known device the gas permeable wall provided with coalescer means of the outlet section comprises two concentric layers of expanded metal, and the outlet section is open at its upper end.

During normal operation, upwardly flowing gas enters through the tangential gas inlets into the contact section of the tubular gas/liquid contact device, and liquid is supplied through the liquid delivery tube to the lower part of the contact section. Liquid entering into the contact section is dispersed by the swirling gas, and in dispersed form liquid is contacted with gas. The swirling fluid enters into the separation section of the tubular gas/liquid contact device. In the separation section liquid moves outwards under the influence of centrifugal forces and it is collected on the inner surface of the wall of the separation section. Gas and liquid enter into the outlet section, and gas leaves the outlet section of the tubular gas/liquid contact device through its open upper end, and liquid coalesces on the expanded metal from where it trickles on the plate.

As the upper end of the outlet section is open, a large amount of liquid can be entrained with the gas leaving the outlet section through its upper end.

To reduce entrainment, an improved tubular gas/liquid contact device was proposed, and this device is disclosed in Mathematical description and analysis of mass transfer mechanics in contact equipment with vortical concurrent stream flow' by N I Saval'ev and N A Nikolaev, Kirov Kazan Chemical Technology Institute, translated from Teoreticheskie Osnovy Khimicheskoi Tekhnologii, Vol. 23, No. 4, pages 435–444, July–August, 1989.

In the latter device the gas permeable wall provided with coalescer means comprises an open-ended tube having a cylindrical wall provided with tangential outlets, and a U-shaped annular deflector arranged over the upper end of the open ended tube, which annular deflector has a skirt extending over the tangential outlets for collecting liquid. So that, during normal operation, part of the upwardly flowing gas is deflected and liquid entrained in the gas is separated from the gas.

III. OBJECTS OF THE INVENTION

Applicant had found that some liquid is collected on the central liquid delivery tube and that this liquid is subsequently blown away and entrained in the centre of the mass of upwardly flowing gas. As this gas is not deflected by the U-shaped annular deflector, some liquid still leaves the open-ended outlet section with the gas. Therefore the separation of gas and liquid is not complete.

It is an object of the present invention to reduce the amount of liquid entrained with the gas leaving the above-described tubular gas/liquid contact device.

IV. SUMMARY OF THE INVENTION

To this end the column for contacting upwardly flowing gas with downwardly flowing liquid according to the present invention is characterized in that the top of the outlet section is provided with a cover.

The cover closes the upper end of the outlet section and thus the cover deflects during normal operation the upwardly passing fluid so that the fluid flows through the gas permeable wall provided with coalescer means.

The liquid delivery tube delivers liquid into the lower part of the contact section of the tubular gas/liquid contact device. The liquid can come from the horizontal tray to which the tubular gas/liquid contact device pertains, and in this case inlet openings are made in the wall of the tubular gas/liquid contact device above the horizontal tray, and the liquid delivery tube is connected by means of supply conduits to the openings. The liquid may as well come from the horizontal tray above it, and in this case the liquid delivery tube is a downcomer tube extending downwards through the tubular gas/liquid contact device.

V. BRIEF DESCRIPTION OF THE DRAWING

The sole FIGURE depicts in one embodiment a side cut-away view of the invention.

VI. DETAILED DESCRIPTION OF EMBODIMENTS OF THE INVENTION

Suitably the gas permeable wall provided with coalescer means of the outlet section comprises a tubular layer of coalescer material, wherein the inner diameter of the tubular layer is equal to or larger than the outer diameter of the separation section. The size of the inner diameter of the tubular layer is so selected that liquid collected in the tubular layer of coalescer material can trickle into the space outside the tubular gas/liquid contact device and onto the plate. In order that the resistance to gas flow through the tubular layer of coalescer material is not too high, the net free area of the tubular layer of coalescer material is larger than or equal to between 1 and 1.5 times the cross-sectional area of the tubular gas/liquid contact device.

Suitably the coalescer material includes a layer of expanded metal, which is a sheet of metal that is slit and stretched into a lattice. More suitably the coalescer material comprises at least two concentric layers of expanded metal.

To improve the separation of liquid from the gas flowing through the gas permeable wall provided with coalescer means of the outlet section, the outlet section further comprises two or more coalescer strips arranged at regular intervals along the outer surface of the gas permeable wall provided with coalescer means.

In the known device, the contact section is provided with several tangential gas inlets which are arranged at regular intervals along the circumference of the contact section. Each tangential gas inlet comprises an elongated strip bent to the inside of the contact section, the height of the strip being substantially equal to the height of the contact section. Upwardly flowing gas entering into the contact section is deflected, and the velocity of the gas in the contact section has a component in axial direction and a component in circumferential direction. The magnitude of the velocity in axial direction determines the time during which gas and liquid are in contact which each other, and it will be understood that the contact time is inversely proportional to the magnitude of the velocity in axial direction. To reduce the magnitude of the velocity in axial direction, each tangential gas inlet comprises a tongue which is bent to the inside of the contact section, the height of the tongue being small compared to the height of the contact section, and the tangential gas inlets are arranged one above the other in a column. The length of the tongue is suitably less than 10 percent of the length of the contact section.

Suitably the contact section is provided with two or more of such columns of tangential gas inlets, which columns are arranged at regular intervals along the circumference of the contact section.

The invention will now be described in more detail with reference to the accompanying drawing showing schematically a cross-section of the column according to the invention.

The column 1 for contacting upwardly flowing gas with downwardly flowing liquid according to the present invention is provided with an inlet (not shown) for gas arranged in the lower part of the column 1, an inlet (not shown) for liquid arranged in the upper part of the column 1, an outlet (not shown) for liquid arranged in the lower end part of the column 1 and an outlet (not shown) for gas arranged in the upper end part of the column 1.

In the column 1 are arranged two horizontal trays, an upper horizontal tray 3 and a lower horizontal tray 5. The horizontal trays 3 and 5 are located between the lowermost inlet for gas and the outlet for gas. The upper horizontal tray 3 comprises a horizontal plate 6 provided with two vertical tubular gas/liquid contact devices 8 extending through openings in the plate 6, and the lower horizontal tray 5 comprises a horizontal plate 7 provided with one vertical tubular gas/liquid contact device 10 extending through an opening in the plate 7.

Each of the tubular gas/liquid contact devices 8 and 10 comprises a contact section 12, a separation section 13 which is arranged above the contact section 12, and an outlet section 15 which is arranged above the separation section 13. The contact sections 12 of the tubular gas/liquid contact devices 8 are located below the plate 6 and the outlet sections 15 are located above the plate 6, and the contact section 12 of the tubular gas/liquid contact device 10 is located below the plate 7 and the outlet section 15 above the plate 7. The contact section 12, the separation section 13 and the outlet section 15 are in fluid communication with each other.

The wall of the contact section 12 is provided with a plurality of tangential gas inlets 16, for the sake of clarity not all tangential gas inlets are referred to with a reference numeral. Each tangential gas inlet 16 comprises a tongue which is bent to the inside of the contact section 12, the height of the tongue being small compared to the height of the contact section 12, and the tangential gas inlets 16 are arranged one above the other in a column 17. The tongues have not been referred to with a reference numeral.

The contact section 12 is closed at its lower end by means of a cover 18. A liquid delivery tube 19 opens into the lower end of the contact section 12. The liquid delivery tubes 19 of the tubular gas/liquid contact devices 8 are connected to supply conduits 20, which have inlet openings 21 opening above the plate 6. The liquid delivery tube 19 of the tubular gas/liquid contact device 10 is a downcomer tube 23 which extends through an opening in the plate 6 from the next higher tray 3 downwards through the tubular gas/liquid contact device 10, which downcomer 23 has an inlet opening 24 which is located above inlet openings 21.

The outlet section 15 comprises a gas permeable wall provided with coalescer means 25. The top of the outlet section 15 is provided with a cover 27.

The gas permeable wall provided with coalescer means 25 comprise a tubular layer of coalescer means in the form of two concentric layers of expanded metal 30, the inner diameter of the tubular layer of coalescer means is equal to or greater than the outer diameter of the separation section 13 so that the tubular layer fits over the separation section 13. The outlet section 15 further comprises two coalescer strips 32 arranged at regular intervals along the outer surface of the gas permeable wall provided with coalescer means 25.

During normal operation liquid is continuously supplied to the inlet (not shown) for liquid arranged in the upper part of the column 1, and gas is continuously supplied to the inlet (not shown) for gas arranged in the lower part of the column 1. Liquid supplied to the upper end of column 1 is collected on plate 6 of the upper horizontal tray 3. Part of the liquid flows through inlet openings 21 into the liquid delivery tubes 19, another part of the liquid flows through inlet opening 24 and downcomer tube 23 into the lower end of the contact section 12 of the tubular gas/liquid contact device 10, and the remainder of the liquid remains on the plate 6. Upwardly flowing gas enters through the tangential gas inlets 16 into the contact sections 12 of the tubular gas/liquid contact devices 8. Liquid entering into the contact sections 12 is dispersed by the swirling gas, and in dispersed form liquid is contacted with gas. The swirling fluid enters into the separation sections 13 of the tubular gas/liquid contact devices 8. In the separation sections 13 liquid moves outwards under the influence of centrifugal forces and it is collected on the inner surfaces of the walls of the separation sections 13. Gas and liquid enter into the outlet sections 15, and leave the outlet sections 15 of the tubular gas/liquid contact devices 8 through coalescer means in the form of the two concentric layers of expanded metal 30. Liquid is collected on the coalescer means and trickles downwards on the plate 6, and gas flows upwards. The outlet sections 15 are provided with coalescer strips 32 which improve the separation, and reduce the entrainment of liquid in the gas. The cover 27 deflects the upwardly flowing fluid so that it flows through the coalescer means.

In case there is a further horizontal tray (not shown) above the upper horizontal tray 3, gas is contacted with liquid in the contact devices (not shown) of that further horizontal tray, and liquid flows after contacting through a downcomer (not shown) onto plate 6. And in case the upper horizontal tray 3 is the uppermost horizontal tray, gas flows to the upper end of the column 1 from which it is withdrawn through the outlet for gas (not shown); and in this case liquid supplied to the liquid inlet is supplied directly onto the plate 6.

Liquid flowing through the downcomer tube 23 is passed to the lower end of the tubular gas/liquid contact device 10 pertaining to the lower horizontal tray 5. In tubular gas/liquid contact device 10, gas and liquid are brought in contact with each other in the same way as described above with reference to the tubular gas/liquid contact devices 8. Liquid leaving the outlet section 15 of the tubular gas/liquid contact device 10 is collected on the plate 7 of the lower horizontal tray 5, and excess liquid is removed from the lower horizontal tray 5 through downcomer tube 35 extending through an opening the plate 7.

In case there is a further horizontal tray (not shown) below the lower horizontal tray 5, downcomer tube 35 opens into a tubular gas/liquid contact device (not shown) of that further horizontal tray; and in case the lower horizontal tray 5 is the lowermost horizontal tray, liquid is discharged into the lower end of the column 1 from which it is withdrawn through the outlet for liquid (not shown).

VII. EXPERIMENTS

Some experiments have been carried out to show the effect of the gas/liquid contacting device of the present invention. In the two experiments four horizontal trays were provided with gas/liquid contacting devices, water was used as the liquid and air was used as the gas. The first experiments were done with the prior art device, wherein the gas permeable wall provided with coalescer means comprises an open-ended tube having a cylindrical wall provided with tangential outlets in the form of vertical slits and a deflector at the top in the form of an annular ring mounted on the upper end of the outlet section. Each tray included eleven devices having an internal diameter of 50 mm. At a gas load of 0.70 m/s the average entrainment was about 0.3. This result can be compared with the result of the four trays each provided with 4 devices according to the present invention each having an internal diameter of 100 mm. For the same liquid flowrate, the entrainment at a gas load of 0.70 m/s was 0.03.

In the above results the entrainment is the volume of liquid entrained per unit of time divided by the volume of liquid supplied to the column per unit time, and the gas load factor is the volume of gas supplied to the contact device per unit time divided by the area of the gas/liquid contacting device times the square root of the ratio of the gas density over the liquid density minus the gas density. With the tubular gas/liquid contact device according to the present invention the entrainment of liquid in the gas leaving the outlet section of the tubular gas/liquid contact device is substantially reduced.

To improve contacting, the lower end of the contact section 12 of the tubular gas/liquid contact device 10, under the lowermost tangential gas inlet 16 is provided with a vortex breaker in the form of a vertical flat plate 38 arranged on the cover 18, the lower end of the liquid delivery tube 19 rests in recess 40 in the upper edge of the flat plate 38. The vortex breaker may as well include two flat plates, wherein one flat plate is in the plane of the drawing (like flat plate 38), and wherein the second flat plate (not shown) is perpendicular to the plane of the drawing.

The outlet section 15 can comprise more than the two coalescer strips 32 which are shown in the drawing, for example between 3 and 5, all coalescer strips are suitably arranged at regular intervals along the outer surface of the gas permeable wall provided with coalescer means 25.

The cross-section of the tubular gas/liquid contact device as discussed with reference to the drawing is circular, however, the cross-section can be polygonal as well.

It will be understood that the lower end of the liquid delivery tube 19 is arranged under the lowermost tangential gas inlet 16, so that, during normal operation, liquid present in the lower end of each of the tubular gas/liquid contact devices 8 and 10 seals the liquid delivery tube 19. In order to allow filling the lower end of each of the contact tubes, the wall of each contact tube is provided with a small aperture (not shown) arranged above the plate of the horizontal tray to which the contact tube pertains and below the inlet opening 24 of the downcomer tube 23. To allow emptying the lower end of a tubular gas/liquid contact device, the cover 18 at the bottom of the contact section 12 is provided with a small aperture (not shown). The size of the apertures in the wall and in the cover is so selected that the presence of the apertures does not adversely affect the separation performance of the tubular gas/liquid contact device.

What is claimed is:

1. A column for contacting upwardly flowing gas with downwardly flowing liquid, wherein said column comprises a horizontal tray comprising a plate provided with a tubular gas/liquid contact device, wherein said tubular gas/liquid contact device comprises a contact section located below said plate, a separation section located above said contact section, and an outlet section located above said separation section and above said plate, wherein said contact section is closed at its bottom, wherein the wall of said contact section is provided with a plurality of tangential gas inlets, wherein a liquid delivery tube opens into the lower end of said contact section, wherein said outlet section comprises a gas permeable wall provided with coalescer means, wherein the top of said outlet section is provided with a cover and wherein said liquid delivery tube is a downcomer tube extending downwards through said cover and said tubular gas/liquid contact device.

2. The column as claimed in claim 1, wherein said gas permeable wall provided with coalescer means of said outlet section comprises a tubular layer of coalescer material, the inner diameter of said tubular layer being at least equal to the outer diameter of said separation section.

3. The column as claimed in claim 2, wherein said coalescer material includes a layer of expanded metal.

4. The column as claimed in claim 3, wherein said coalescer material comprises two concentric layers of expanded metal.

5. The column as claimed in claim 1, wherein said outlet section further comprises two or more coalescer strips arranged at regular intervals along the outer surface of said gas permeable wall provided with said coalescer means.

6. The column as claimed in claim 5, wherein each of said tangential gas inlets comprises a tongue which is bent to the inside of said contact section, the height of each tongue being small compared to the height of said contact section, and wherein said tangential gas inlets are arranged one above the other in a column.

7. The column as claimed in claim 6, wherein said contact section is provided with two or more columns of tangential inlets, said columns being arranged at regular intervals along the circumference of said contact section.

* * * * *